Sept. 4, 1928.

A. H. KROGAN 1,683,042

CORN CUTTER

Filed Jan. 25, 1926

6 Sheets-Sheet 1

A. H. Krogan Inventor

By C. A. Snow & Co.

Attorneys.

Sept. 4, 1928.

A. H. KROGAN 1,683,042

CORN CUTTER

Filed Jan. 25, 1926

6 Sheets-Sheet 3

A. H. Krogan
Inventor

By C. A. Snow & Co.
Attorneys.

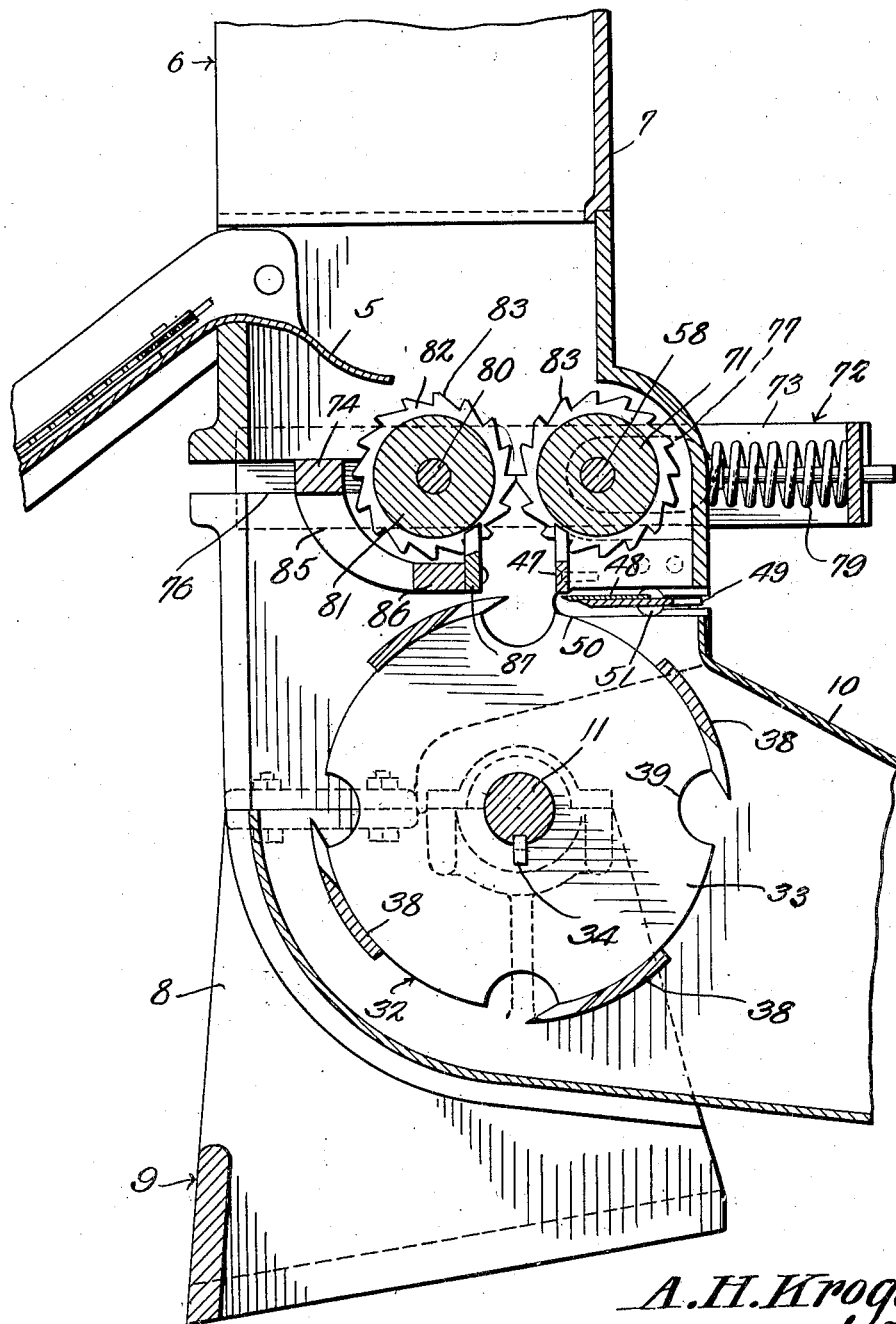

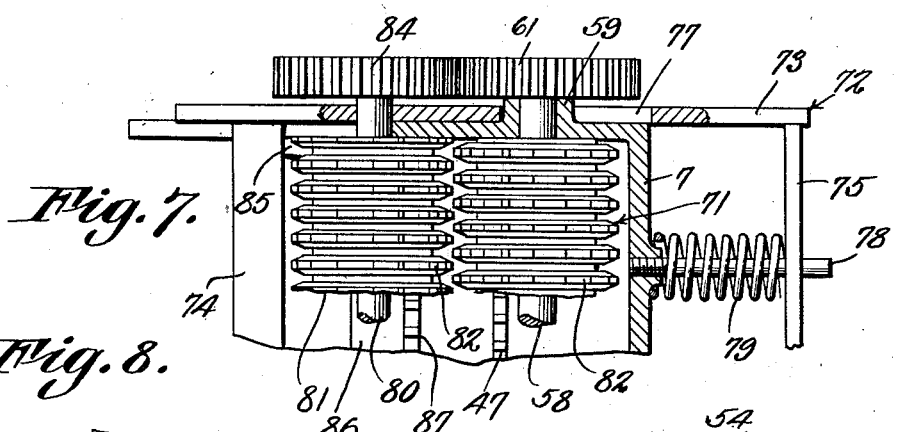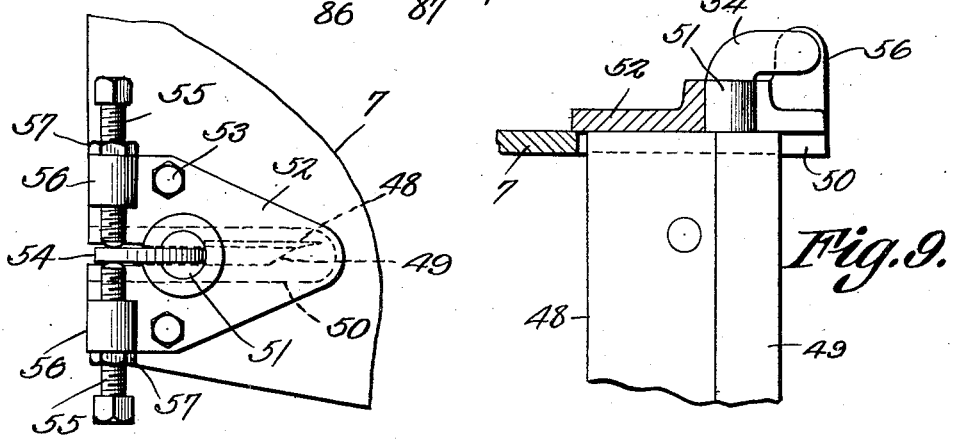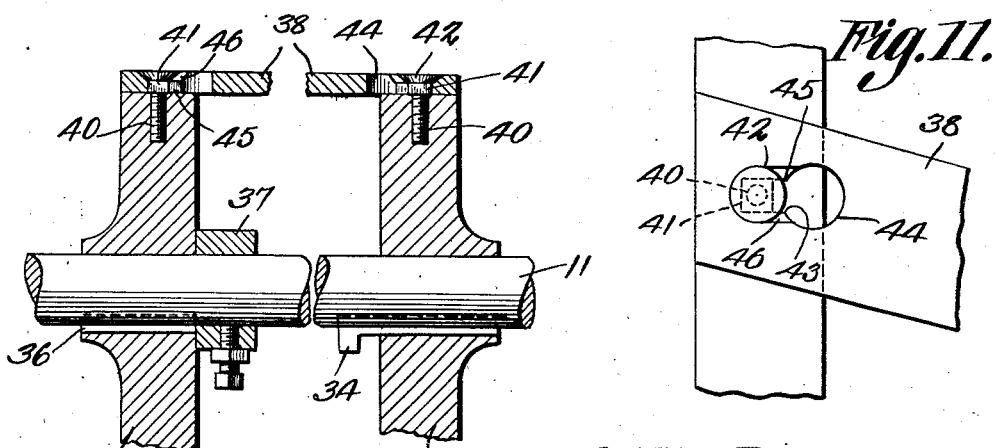

Patented Sept. 4, 1928.

1,683,042

UNITED STATES PATENT OFFICE.

ABNER H. KROGAN, OF STANLEY, WISCONSIN.

CORN CUTTER.

Application filed January 25, 1926. Serial No. 83,708.

This invention aims to provide novel means for cutting standing corn in a field, elevating the corn, cutting it to ensilage length, and carrying the ensilage laterally and upwardly so that it may be deposited in a wagon box or the like.

The invention aims, specifically, to provide novel means for cutting the corn to ensilage length.

A further object of the invention is to provide novel means whereby the various parts which are movable, are yoked and coupled together, so as to be driven from a single source of power.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1:
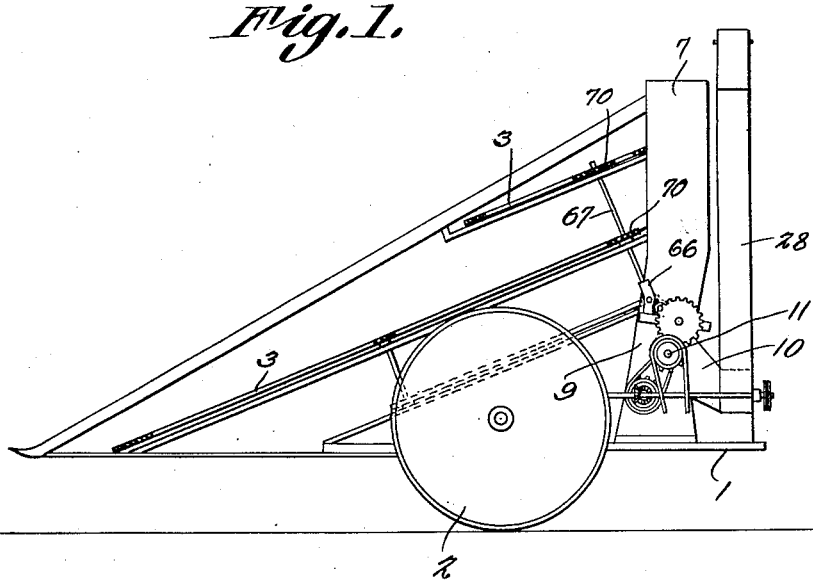
Figure 2:
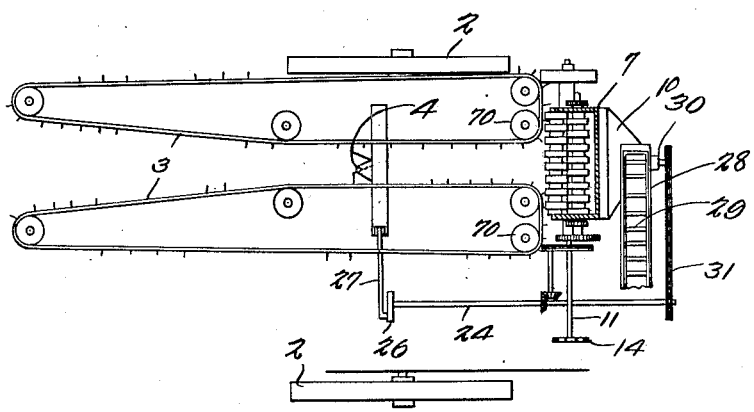
Figure 3:
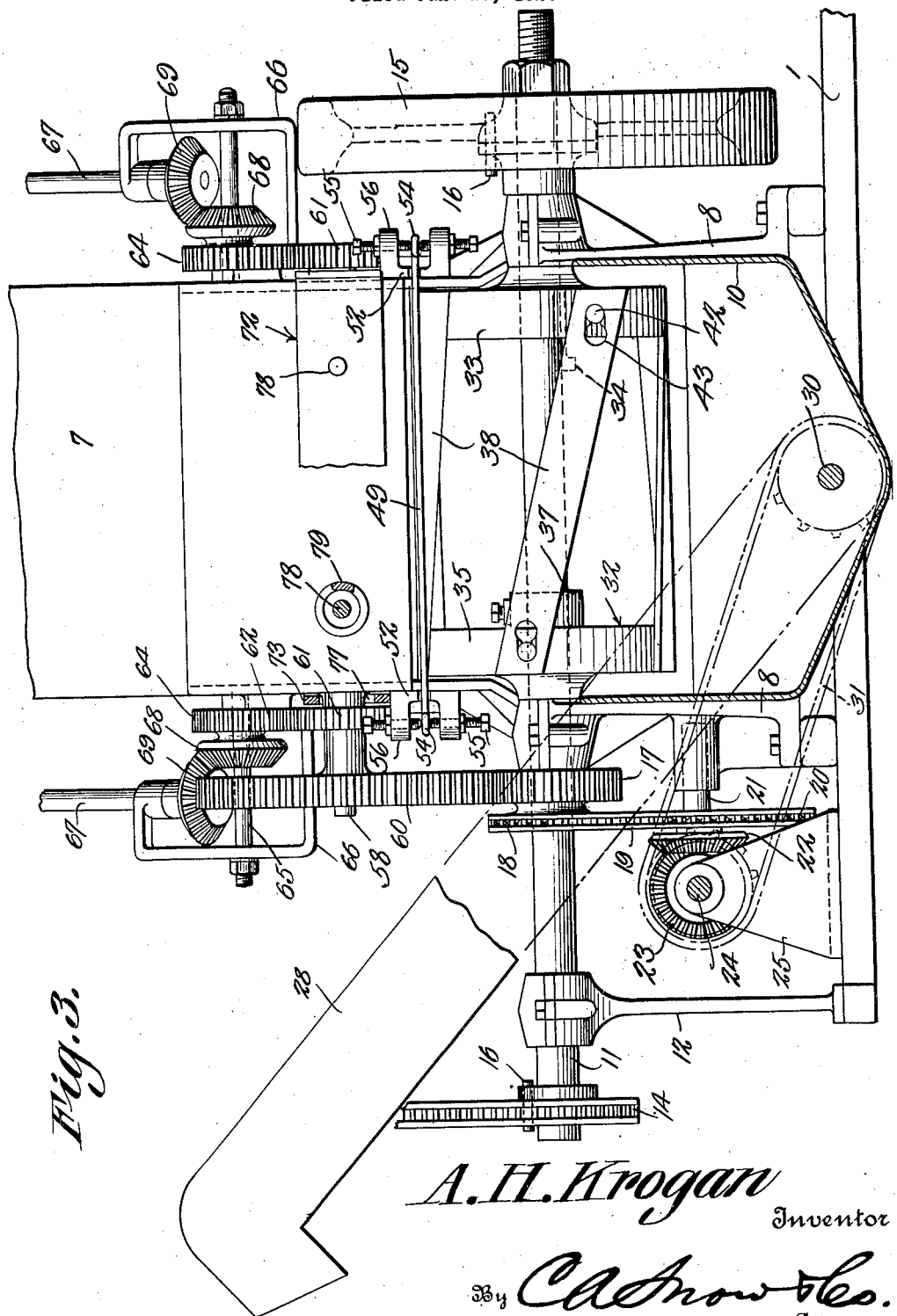
Figure 4:
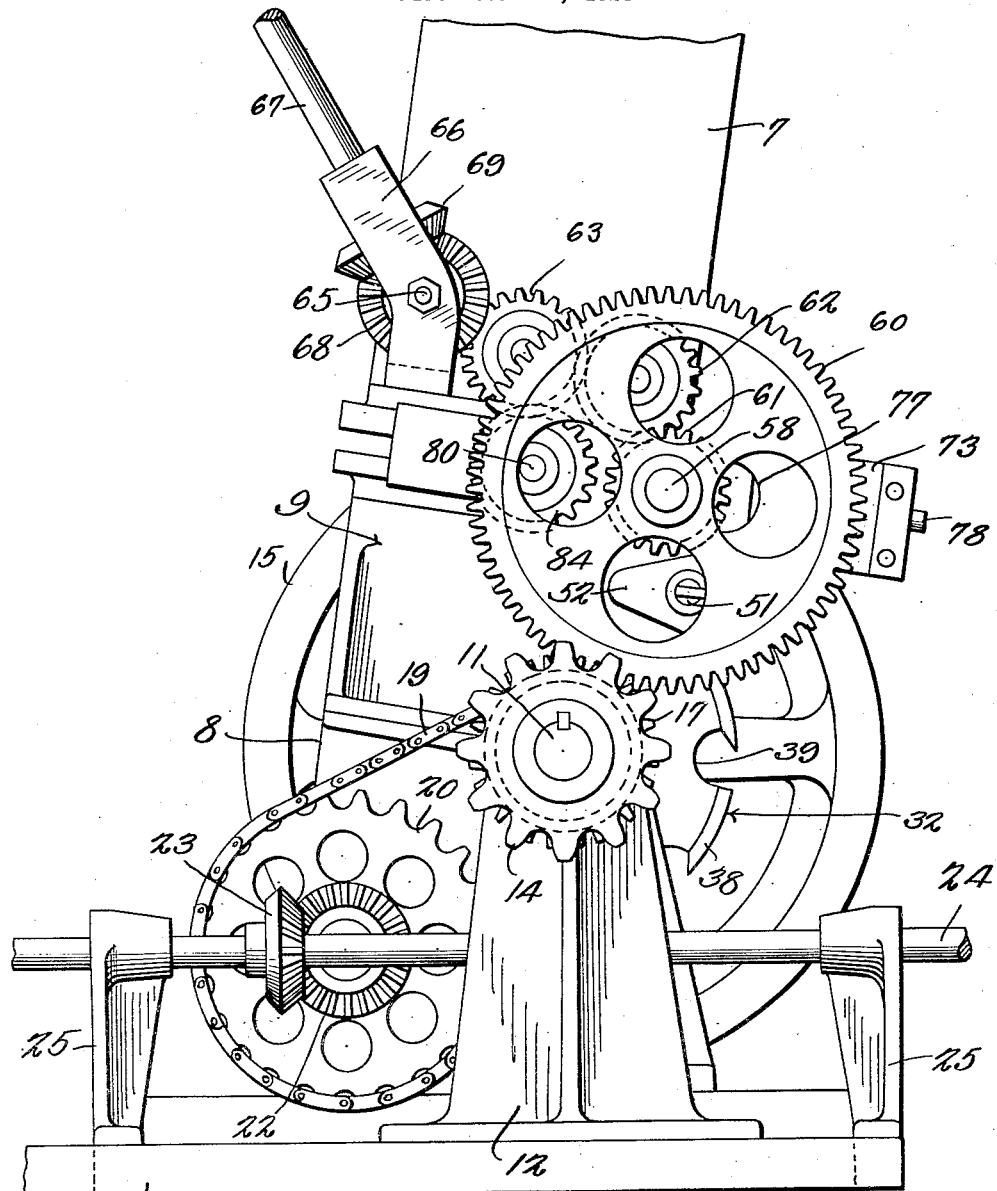
Figure 5:
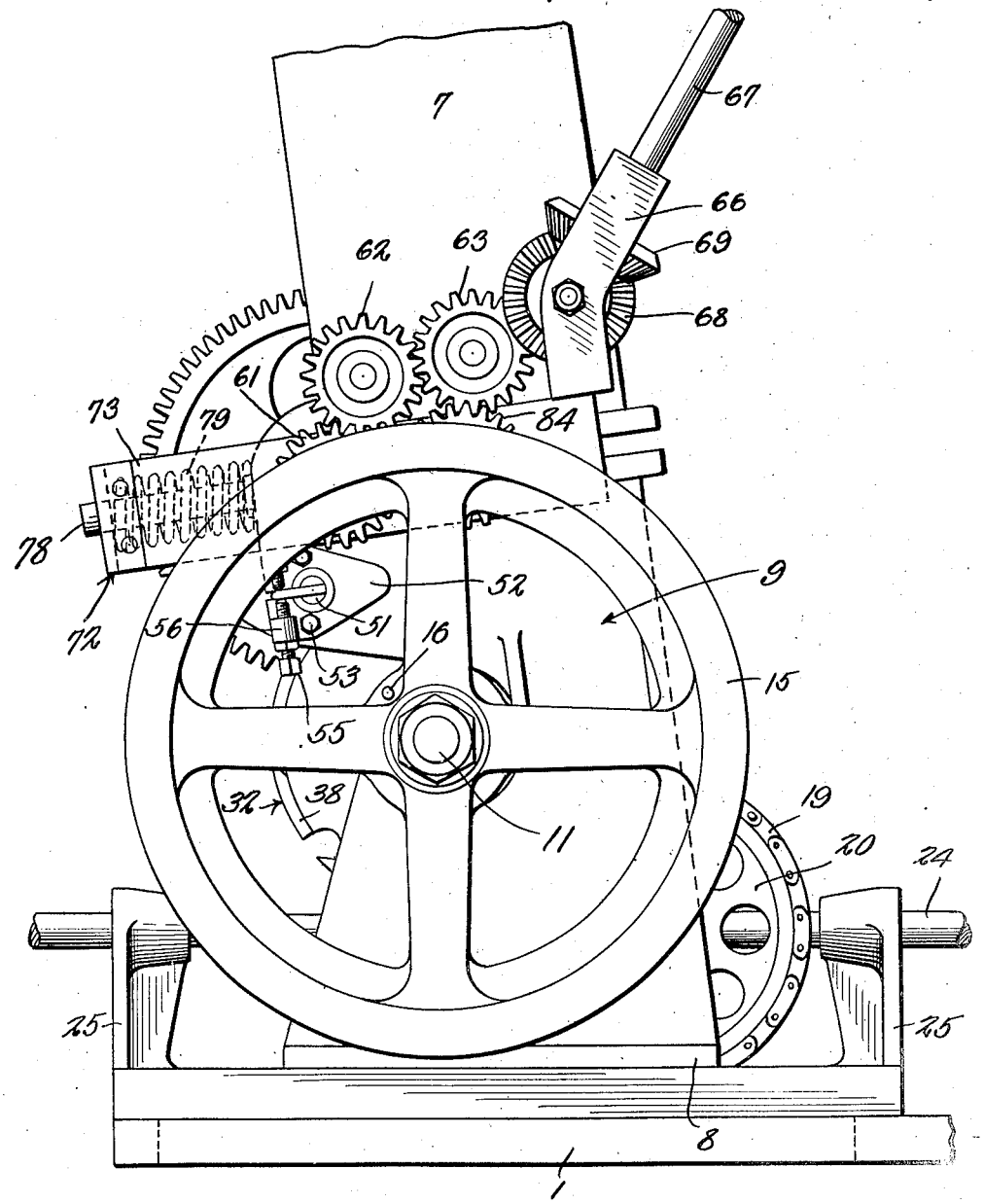

Figure 1 shows in diagrammatic side elevation, a machine constructed in accordance with the invention; Figure 2 is a diagrammatic top plan wherein parts are broken away; Figure 3 is a rear elevation of the ensilage cutter and attendant parts, portions being in section; Figure 4 is a side elevation of the ensilage cutter; Figure 5 is an elevation wherein appears the opposite side of the ensilage cutter from that delineated in Figure 4; Figure 6 is a vertical section taken through the ensilage cutter; Figure 7 is a fragmental top plan showing a portion of the feed rolls; Figure 8 is an elevation showing the mechanism whereby one of the knives is adjusted; Figure 9 is a plan of the adjustable knife, some parts being in section; Figure 10 is a sectional view of the rotary cutter, parts being broken away; Figure 11 is a plan showing one of the blades and one of the heads of the rotary cutter.

The device forming the subject matter of this application may form part of a wheel-mounted truck, the platform of which is marked by the numeral 1, the ground wheels being shown at 2. The usual gathering chains 3 for the standing corn are provided, the chains carrying the corn against a cutter, such as a reciprocating knife 4, the corn being elevated and being passed over an inclined lip 5 (Figure 6) into the open front 6 of a vertical casing 7 supported by standards 8 (Figure 3) on the platform 1, the standards constituting a part of a frame 9. Within the casing 7, the corn is cut up to ensilage length, and moves rearwardly, out of the lower end of the casing 7, through a chute 10, supported by the standards 8, the chute 10 discharging the ensilage into a lateral delivery member 28, supported in any suitable way on the frame work of the machine, the ensilage being carried up the delivery member 28 by a conveyor 29, which may be a chain, it being obvious that the ensilage may flow out of the upper end of the delivery member 28 into a wagon (not shown) driven along side of the truck which is depicted in Figures 1 and 2.

A first or main shaft 11 (Figs. 3 and 6) is journaled on the standards 8 and in a bearing post 12 on the platform 1. Rotation is imparted to the shaft 11 in any suitable way, for instance, but not of necessity, by a sprocket wheel 14. The shaft 11 carries a fly wheel 15, the fly wheel and the sprocket wheel 14 being located on opposite sides of the casing 7, as Figure 3 shows. The fly wheel 15 and the sprocket wheel 14 may be connected to the shaft 11 by break pins 16, for a purpose well understood by anyone who knows what a break pin is.

There is a pinion 17 on the shaft 11, a sprocket wheel 18 being connected to the pinion 17 to turn therewith. A sprocket chain 19, seen in Figures 4 and 3, is engaged with the sprocket wheel 18 and, also, with a sprocket wheel 20 which is supported at 21 for rotation on one of the standards 8. A beveled pinion 22 turns with the sprocket wheel 20 and rotates a beveled pinion 23 on a shaft 24, extended lengthwise of the machine and journaled in posts 25 mounted on the platform 1 or elsewhere. As seen in Figure 2, there is a crank disk 26 or its equivalent on the forward end of the shaft 24, the crank disk being connected by a pitman 27, with the knife 4, a means thus being provided for operating the knife. The rear end of the shaft 24 is connected by a chain and sprocket drive 31 (Figs. 2 and 3) with a shaft 30 that is mounted to rotate at the lower end of the delivery member 28, the shaft 30 operating the conveyor 29 which has been mentioned hereinbefore.

A rotary cutter 32 is carried by the shaft 11 and is located in the casing 7. Figs. 3 and 6 give a good idea as to the general location of the cutter, and its construction will be understood when the aforesaid figures are examined in connection with Figures 10 and 11, in the light of the following description.

The rotary cutter 32 comprises a head 33 which is secured and fixed to the shaft 11 by means of a key 34. A head 35 is adjustable lengthwise of the shaft 11, and is connected by a key 36 or the like, to the shaft 11, to rotate therewith. Movement of the head 35 toward the head 33 is restrained by a set collar 37 which may be adjusted along the shaft 11. The ends of the cutting blades 38 are mounted on the peripheries of the heads 33 and 35, and, as shown in Figure 6, the said heads have peripheral clearance recesses 39 adjacent to the cutting edges of the blades. Securing elements 40, such as screws, are mounted in the edges of the heads 33 and 35, the securing elements having necks 41 which are rectangular in cross section, the securing elements including enlarged heads 42. There are key hole slots 43 in the end portions of the blades 38, each key hole slot including an enlarged part 44 and a reduced part 45. The set collar 37 is loosened, the head 35 is slid a little way toward the head 33, the enlarged parts 42 of the securing elements 40 are passed through the enlarged parts 44 of the key hole slots 43 in the blades 38, the head 35 is moved to the left in Figure 10 until the polygonal necks 41 of the securing elements 40 are received in the reduced parts 45 of the key hole slots 43 in the blades 38 and, when the set collar 37 is secured in place on the shaft 11, the blades 38 will be held in the positions shown in Figures 10 and 11. The blades 38 are recessed at 46, lengthwise, to accommodate the heads 42 of the securing elements 40 when the necks 41 of the securing elements 40 are received in the reduced parts 45 of the key hole slots 43. Because the necks 41 of the securing elements 40 are held against rotation in the reduced parts 45 of the key hole slots, the securing elements cannot thread out of the heads 35 and 33, when the parts are arranged as shown in Figures 10 and 11.

Referring to Figure 6, for instance, it will be seen that a fixed shear and guide bar 47 extends across the casing 7, above the rotary cutter 32. Below the shear bar 47 there is a blade 48 which is mounted on a support or bar 49, seen in Figure 9. At their ends, the blade 48 and the support or bar 49 are received in slots 50 which are formed in the sides of the casing 7. The support 49 is supplied at its ends with trunnions 51 mounted to rock in bearing plates 52 attached by securing elements 53, as seen in Figures 8 and 5, to the outer surfaces of the sides of the casing 7. The trunnions 51 have projecting arms 54 which are received between adjusting devices, such as screws 55 threaded into lugs 56 on the bearing plates 52, the screws being held in adjusted positions by lock nuts 57 on the said screws and engaging the lugs 56.

A horizontal shaft 58 (Figs. 6 and 7) is located above the blade 48 and is journaled in bearings 59 on the sides of the casing 7. The shaft 58 carries a feed roll which is denoted generally by the numeral 71. Noting Figure 4, in comparison with Figure 3, it will be observed that the shaft 58 is provided at its ends with pinions 61 meshing into pinions 62 supported on the casing 7, the pinions 62 meshing with pinions 63 likewise supported on the casing, the pinions 63 meshing with pinions 64 journaled on bolts or other securing elements 65 which retain brackets 66 on the casing 7, upwardly extended and forwardly inclined shafts 67 being journaled in the brackets 66, the shafts 67 carrying beveled gears 69 which mesh with beveled gears 68 that are connected to the pinions 64, to rotate therewith. The shafts 67 are provided, as seen in Figure 2, with sprocket wheels 70 for operating the gathering chains 3. The shaft 58 is driven from the shaft 11 by means of a gear wheel 60 on the shaft 58, the said gear wheel meshing with the pinion 17 on the shaft 11.

Reference has been made hereinbefore to the feed wheel 71, shown, for example, in Figure 6. The feed wheel 71 turns about a fixed axis and cooperates with a feed wheel or roll 81 which is held resiliently for shifting movement toward and away from the feed roll 71. In order to provide for the aforesaid movement of the feed roll 81 with respect to the feed roll 71, the feed roll 81 is journaled on a frame 72 mounted for sliding movement, in a substantially horizontal plane, on the casing 7. Passing to a more detailed explanation of the construction and mounting of the frame 72, it may be pointed out that the frame embodies side bars 73 connected by end bars 74 and 75, as disclosed in Figure 7. There are guide slots 76 in the casing 7, and in these guide slots, the end bar 74 of the frame 72 reciprocates. The side members 73 of the frame 72 have elongated slots 77, receiving the bearings 59 of the casing 7. Studs 78 project rearwardly from the casing 7, the end bar 75 of the frame 72 being mounted slidably on the studs 78, and compression springs 79 being disposed between the end bar 75 and the casing 7, the springs being disposed about the studs 78. In the side bars 73 of the frame 72 is journaled a shaft 80 which carries the feed roll 81, hereinbefore mentioned. The feed rolls 71 and 81 have cooperating circumferential ribs 82

(Figure 7) supplied with teeth 83, (Figure 6). Pinions 84 on the shaft 80 mesh with the pinions 63 to impart rotation to the shaft 80 and to the feed roll 81. The end bar 74 of the frame 72 carries depending and rearwardly extended arms 85 (Figure 6) connected by a cross piece 86 carrying a guide bar 87 which is individual to the feed roll 81. The parts 87 and 47 are referred to as guide bars, because the material passes between them, from the feed rolls 71 and 81 to the rotary cutter 32.

The operation of the machine will be outlined generally and broadly, then the drives will be traced out, and then the advantages of certain parts of the device will be explained.

Referring to the general operation of the machine, and considering Figure 2, those skilled in the art will understand that the gathering chains 6 pass the standing corn back to the knife 4, which cuts the corn, the corn passing into the casing 7 of Figure 6, by way of the lip 5. The corn is carried downwardly by the rotating feed rolls 71 and 81, and is cut into ensilage length when the knives or blades 38 of the rotary cutter 32 cooperate with the shear bar 47 and with the blade 48. The ensilage passes by way of the chute 10 into the delivery member 28 and is carried upwardly through the delivery member by means of the conveyor 29, the ensilage being discharged at the side of the machine as will be understood readily from Figure 3.

The rotary cutter 32 is driven directly by the shaft 11. The shaft 11 rotates the sprocket wheel 18, the sprocket chain 19 rotates the sprocket wheel 20, rotation being imparted to the beveled pinion 22, the pinion 22 and the pinion 23 driving the shaft 24, the crank disk 26 and the pitman 27 operating the cutter 4. Motion taken off the rear end of the shaft 24 by the chain and sprocket drive 31, is transmitted to the shaft 30, and, thus, the conveyor 29 is operated in the lateral delivery member 28.

The gathering chains 3 are operated from the shaft 11 by trains each including the following elements: the pinion 17, the gear wheel 60, the shaft 58, the pinion 61, the pinion 62, the pinion 63, the pinion 64, the beveled gear 68, the beveled gear 69, the shaft 67, and the sprocket wheel 70. The feed roll 71 is operated from the shaft 11 by a chain of parts including the pinion 17, the gear wheel 60 and the shaft 58, motion being transmitted to the feed roll 81 by way of the pinion 61, the pinion 62, the pinion 63 and the pinion 84.

The spring 79 slides the frame 72 horizontally, thereby holding the feed roll 81 yieldably in proper relation to the feed roll 71, and causing the feed rolls to operate properly, although the amount of material which passes between them may vary from time to time. By adjusting the screws 55 of Figure 8, the arms 54 may be caused to rock the trunnions 51 on the bar 49, thus shifting the position of the blade 48 with respect to the shear bar 47 and with respect to the knives 38 of the rotary cutting member 32. The knife or blade 48 prevents the corn, and particularly the leaves thereof, from being dragged around by the rotary cutting member 32, across the lower edge of the shear bar 47, and, in this respect, the device forming the subject matter of this application has important advantages over earlier machines of a similar sort. The construction shown in Figures 8 and 9 is such that by detaching the bearing plates 52, the blade 48 may be removed, along with its support 49, out of the slots 50 in the casing 7. Attention is again directed to the novel means whereby the blades 48 are held on the heads 35 and 33 of the rotary cutting member, as shown in Figures 10 and 11, but since that part of the machine has been described at considerable length hereinbefore, a brief allusion to the mechanism shown in Figures 10 and 11 will suffice at this point.

What is claimed is:—

1. In a device of the class described, a casing having a guide slot, a stud on the casing, a first feed roll journaled in the casing, a frame including side bars and end bars, one end bar being slidably mounted in the guide slot, and the other end bar being slidably mounted on the stud, a second feed roll journaled on the side bars, a spring cooperating with the casing and with the last-specified end bar to slide the frame and to vary the distance between the feed rolls, the spring being disposed about the stud, means for driving the rolls, and cutting mechanism whereon the rolls discharge.

2. In a device of the class described, a casing having an opening, a shear member in the casing, a rotary cutter journaled in the casing, and cooperating with the shear member, a blade located between the cutter and the shear member, a support carrying the blade, the support and the blade being removable through the opening, a bearing member, means for detachably securing the bearing member to the casing, means for mounting the support for rocking movement in the bearing member, and means carried by the bearing member for imparting rocking movement to the support, at the will of an operator, thereby to adjust the position of the blade with respect to the cutter and with respect to the shear member.

3. In a device of the class described, a casing, a shaft journaled in the casing, heads on the shaft, securing elements carried by the heads, the securing element including a neck and an enlargement, a blade mounted on the heads, the blade having key-hole slots, the enlarged portions of the key-hole slots being adapted to receive the enlargements of the securing elements, and the reduced portions of the key-hole slots being adapted to receive the necks of the securing elements, one head being adjustable longitudinally of the shaft to permit the necks of the securing elements to be received in the reduced portions of the key-hole slots, and means for holding said head in adjusted positions longitudinally of the shaft.

4. In a device of the class described, a casing, a shaft journaled in the casing, heads on the shaft, securing elements carried by the heads, the securing element including a neck and an enlargement, a blade mounted on the heads, the blade having key-holt slots, the enlarged portions of the key-hole slots being adapted to receive the enlargements of the securing elements, and the reduced portions of the key-hole slots being adapted to receive the necks of the securing elements, the securing elements being threaded into the heads, the necks of the securing elements being polygonal and being held against rotation in the reduced portions of the key-hole slots, thereby to prevent the securing elements from being threaded accidently out of the heads, one head being adjustable longitudinally of the shaft to permit the necks of the securing elements to be received in the reduced portions of the key-hole slots, and means for holding said head in adjusted positions longitudinally of the shaft.

5. In a device of the class described, a casing, a first feed roll mounted to turn in the casing, a frame, a second feed roll in the casing and cooperating with the first feed roll, the second feed roll being mounted to turn on the frame, means for mounting the frame on the casing for sliding movement in a straight line, crosswise of the casing, to adjust the distance between the feed rolls, a spring interposed between a part of the casing and a part of the frame, and constituting means for moving the frame, to carry the second roll towards the first roll, a cutting mechanism receiving material from the rolls, a guide bar located between the first feed roll and the cutting mechanism, means for mounting the guide bar fixedly, a guide bar cooperating with the fixed guide bar and disposed between the second feed roll and the cutting mechanism, and means connecting the second-specified guide bar to the frame for movement with the frame in fixed relation with respect to the second feed roll.

In testimony that I claim the foregoing as my own, I have hereto affixed my signature.

ABNER H. KROGAN.